United States Patent

[11] 3,585,341

[72] Inventor Thomas J. O'Connor
 100 Morgan Rd., Ann Arbor, Mich. 48104
[21] Appl. No. 768,697
[22] Filed Oct. 18, 1968
[45] Patented June 15, 1971

[54] STRUCTURE FOR AND METHOD OF ELECTRICAL MACHINING
 12 Claims, 6 Drawing Figs.
[52] U.S. Cl. .................................................. 219/69,
 308/36.3
[51] Int. Cl. ..................................................... B23p 1/00
[50] Field of Search ........................................ 219/69 E,
 69, 69 V, 161; 308/36.3

[56] References Cited
UNITED STATES PATENTS

| | | | |
|---|---|---|---|
| 654,881 | 7/1900 | Durand | 308/36.3 X |
| 1,217,431 | 2/1917 | Foley | 219/69 (V) X |
| 2,696,547 | 12/1954 | Felton et al. | 219/161 |
| 2,719,902 | 10/1955 | Flynn | 219/69 (V) |
| 2,730,602 | 1/1956 | Porterfield | 219/69 (V) |
| 2,778,925 | 1/1957 | Gross et al. | 219/69 (E) |
| 2,868,947 | 1/1959 | Williams et al. | 219/69 (V) |
| 2,899,245 | 8/1959 | Michel | 308/36.3 |

Primary Examiner—J. V. Truhe
Assistant Examiner—R. O'Neill
Attorney—Whittemore, Hulbert & Belknap ABSTRACT: A machine tool comprising a large elongated fluid tank, dry chamber boxes at each end of the tank supporting spindles having electrodes secured thereto for reciprocal movement toward and away from a workpiece positioned between the dry chambers in the middle of the fluid tank. Means for moving the dry chamber and the spindle and electrode carried thereby toward and away from the workpiece and for simultaneously rotating the spindles and electrodes. An electrical machining power supply with each spindle at each end of the dielectric tank, servo means for controlling the movement of the spindles and separate fluid supply means for passing fluid through the spindles to the electrodes. Adjusting bolt and abutment structure at one end of the tank for aligning the spindles at the opposite ends of the tank. Structures for hydraulically clamping a workpiece between the electrodes and for levelling a worktable in position beneath the electrodes in the tank.

The method including moving a pair of electrodes toward a workpiece from the opposite sides thereof, maintaining a predetermined gap between the electrodes and workpiece while simultaneously rotating the electrodes and passing an electric signal between the electrodes and workpiece in the presence of a dielectric or an electrolyte.

PATENTED JUN 15 1971

INVENTOR
THOMAS J. O'CONNOR

BY *Whittemore, Hulbert & Belknap*

ATTORNEYS

INVENTOR
THOMAS J. O'CONNOR

BY
ATTORNEYS 3,585,341

STRUCTURE FOR AND METHOD OF ELECTRICAL MACHINING

BACKGROUND OF THE INVENTION

1. Field of the Invention

The invention relates to electrical machining and refers more specifically to apparatus for the simultaneous electrical discharge machining of opposite sides of a conductive workpiece with rotating electrodes. The invention is not limited to electrical discharge machining wince other electrical machining, as for example electrochemical machining may be carried out by the structure and method of the invention.

2. Description of the Prior Art

It is often necessary in industrial applications to machine opposite sides of a workpiece, such as a circular disc. In the past such machining has usually been done by conventional rotary metal-to-metal cutting. Wherein such work has been accomplished by electrical machining, the machining structure has normally been such that each of the sides of the workpiece have been separately machined. Such machining structure and methods are unduly expensive in that they take an undue amount of time for the machining process and required two machine setups.

In addition, the machine setups of the past have often used makeshift supports for the workpiece and wherein machining from opposite sides of the workpiece has been attempted, alignment of the machining structures on the opposite sides of the workpiece has often been inaccurate. Further, with prior machining structures, levelling of a worktable has generally been a time consuming and tedious task, requiring a plurality of trial and error levelling operations to provide a level table.

SUMMARY OF THE INVENTION

The electrical machining structure provided in accordance with the invention includes a machine tool having means for rapidly and accurately levelling a worktable, means for hydraulically clamping a workpiece in position above the worktable, means for aligning a pair of electrodes on opposite sides of a workpiece, and means for simultaneously moving electrodes on opposite sides of a workpiece toward or away from a workpiece while rotating the electrodes. Structures are also provided for passing an electrical signal to the rotating electrodes, for maintaining a predetermined spacing between the electrodes and workpiece, and for feeding a fluid through the electrodes and between the electrodes and workpiece to accomplish electrical machining rapidly, accurately and efficiently.

The method of electrical machining in accordance with the invention therefore includes the steps of simultaneously rotating electrodes on opposite sides of a workpiece while advancing the electrodes toward the workpiece and maintaining a predetermined gap therebetween, passing an electrical signal between the electrodes and workpiece and passing a fluid between the electrodes and workpiece.

DESCRIPTION OF THE PREFERRED EMBODIMENT

The structure 10 for electrical machining includes the machine tool 11, the electrical machining power supplies 13 and the servocontrol apparatus 15. Electrical machining power supplies and servocontrol apparatus operable in conjunction therewith to maintain a predetermined spark gap between an electrode and a workpiece are well known and may by way of example be an electrical discharge power supply and associated servocontrol apparatus. The power supplies 13 and servocontrol apparatus 15 will not therefore be considered in detail herein.

Figure 1:
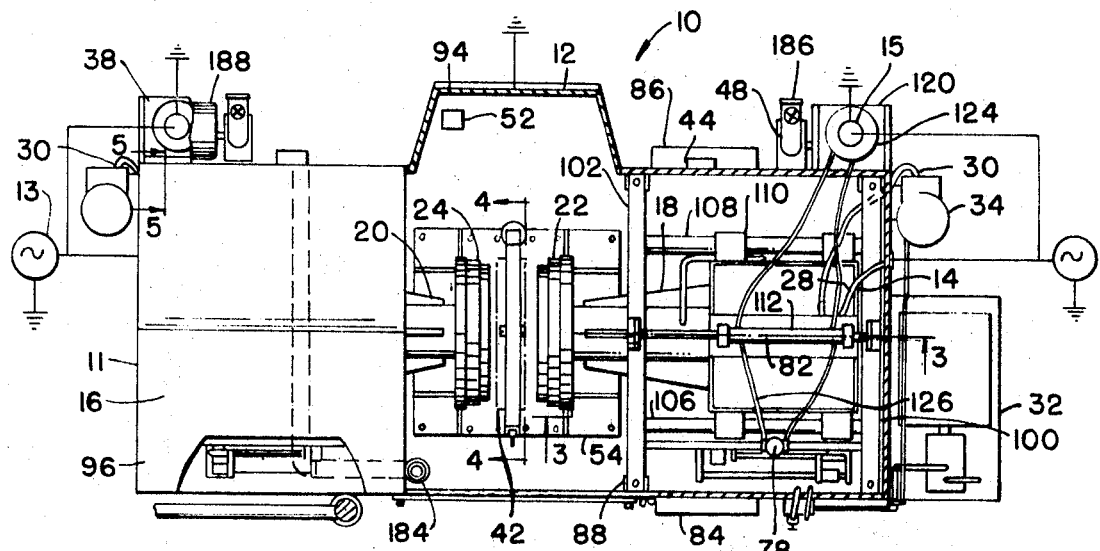
FIG. 1 is a plan view of structure for electrical machining in accordance with the method of the invention.
Figure 2:
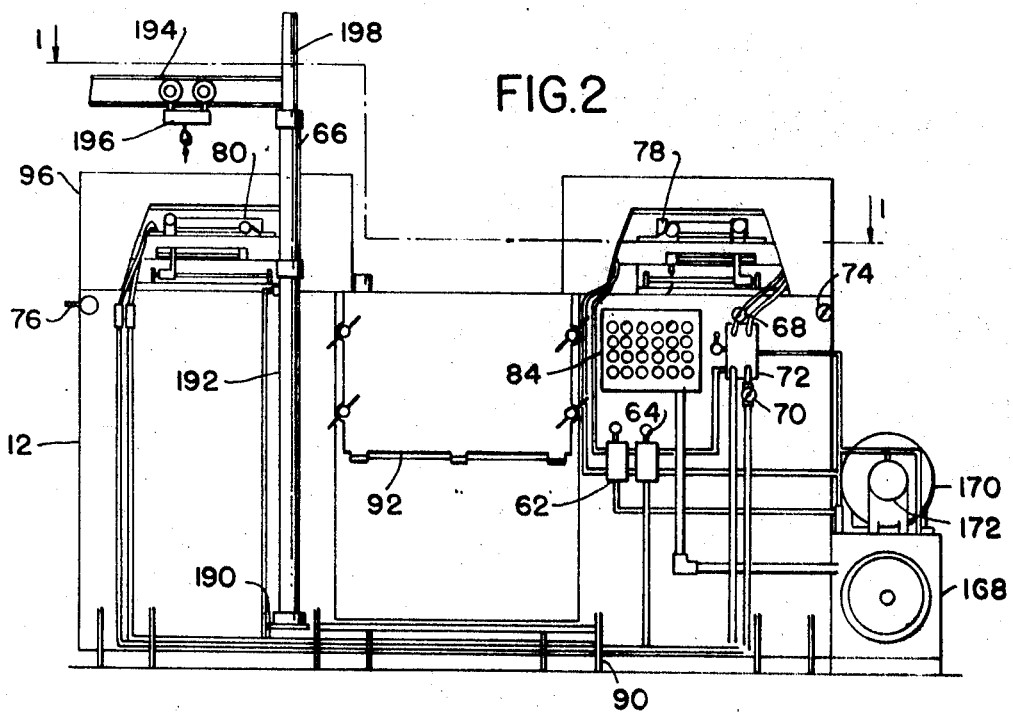
FIG. 2 is a front elevation view of the machine tool portion of the structure for electrical machining illustrated in FIG. 1.

The machining tool 11, as illustrated in FIGS. 1 and 2, includes a dielectric tank 12, a pair of dry chamber boxes 14 and 16 positioned at opposite ends of the tank 12 for movement toward and away from the center of the tank and spindles 18 and 20 carried by the chamber structures 14 and 16, respectively, adapted to receive electrodes 22 and 24. Each of the box structures has means 26 mounted therein for rotating the respective spindles, means 28 carried thereby for passing an electrical machining signal from power supplies 13 through the respective spindles, and structure 30 extending thereinto for feeding a dielectric fluid axially of the respective spindle.

Hydraulic fluid supply means 32 is provided at one end of the tank 12 for supplying hydraulic fluid to the means 26 for rotating the spindles 18 and 20. In addition, dielectric fluid supply means 34 are provided at opposite ends of the tank 12 for pumping hydraulic fluid through the spindles 18 and 20. Electrohydraulic structure 38 at the opposite ends of the tank 12 provide hydraulic pressure for moving the dry chamber structures, spindles and electrodes toward and away from the center of the tank 12 in conjunction with servocontrol apparatus 15 to maintain a predetermined spark gap between the electrodes 22 and 24 and a workpiece 42 secured in the tank 12. Dielectric fluid intake connections 44 and quick drain motor and pump structures 48 are also provided at the rear of the tank 12, as shown best in FIG. 2. Liquid level control switches, such as switch 52, are provided in the tank 12, as required, to limit the level of fluid in the tank 12.

Figure 4:
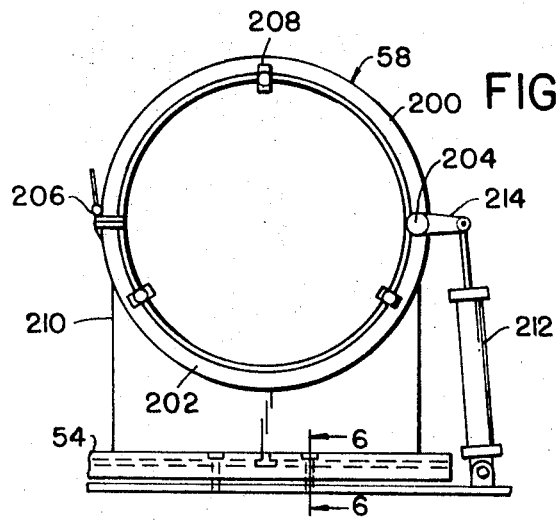
FIG. 4 is an enlarged, partial section view of the structure for electrical machining illustrated in FIG. 1 showing workpiece clamping structure in elevation taken substantially on the line 4–4 in FIG. 1.
Figure 5:
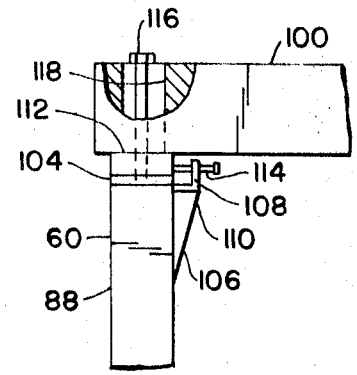
FIG. 5 is an enlarged, partial section view of the structure for electrical machining illustrated in FIG. 1 showing spindle aligning structure in elevation taken substantially on the line 5–5 in FIG. 1.
Figure 6:
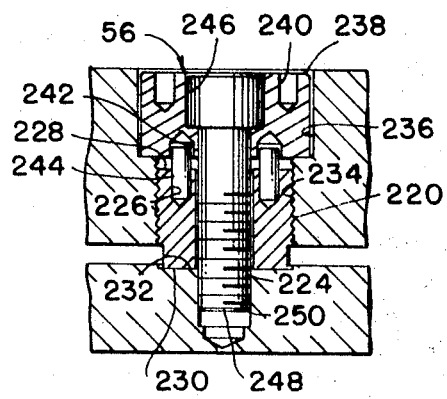
FIG. 6 is an enlarged, partial section view of the structure for electrical machining illustrated in FIG. 1 taken substantially on the line 6–6 in FIG. 4 showing levelling structure.

A worktable 54 is positioned within the tank 12 and may be levelled by the levelling structure 56 shown in FIG. 6. Hydraulic clamping structure 58, as shown best in FIG. 4, is secured to the worktable 54 for clamping a workpiece 42 in position in the tank 12, as shown in FIG. 1. The dry chamber structure 14 is adjustable transversely of the spindle 18 by means of the adjusting structure 60, shown in FIG. 5.

Hydraulic controls 62 and 64 are secured to the tank 12 for operating the hydraulic clamping structure 58 and the telescoping hydraulic jib crane 66 which is secured to the tank 12 of the machine tool 11. Hydraulic control valves 68 and 70 are provided for controlling the speed of rotation of the spindles 18 and 20, respectively, on opening the hydraulic valve 72. The dielectric flow through the structures 30 and spindles 18 and 20 is controlled by the manual valves 74 and 76. Bypass valves 78 and 80 are provided in conjunction with structure 82 for moving the dry chamber structures toward and away from the workpiece to permit bypassing of hydraulic fluid from the electrohydraulic structures 38 so that the spindles may be stopped in a predetermined position during setup of a workpiece. The electrical control panel 84 is secured to the front of the machine tool 11 and functions to provide the required control of the various electrical motors, float switches and other mechanisms of the machine tool 11 in conjunction with an electrical control panel 86 secured to the back of the tool 11, as shown in FIG. 1.

More particularly, the dielectric tank 12 is suitably reinforced by structural steel members, such as members 88 and 90, where such reinforcement is necessary due to the particular tank size. Members 90 extend transversely of the tank 12 and provide a base therefor. A removable panel 92 is secured to the front of the tank 12 to facilitate positioning of a workpiece 42 in the clamping structure 58 by means of the crane 66 when desired. The extension 94 is provided at the rear of the tank 12, also to facilitate setup of workpiece in the tank 12 without the necessity of providing an excessively large tank. Hoods 96 are provided over the opposite ends of the dielectric tank 12.

Figure 3:
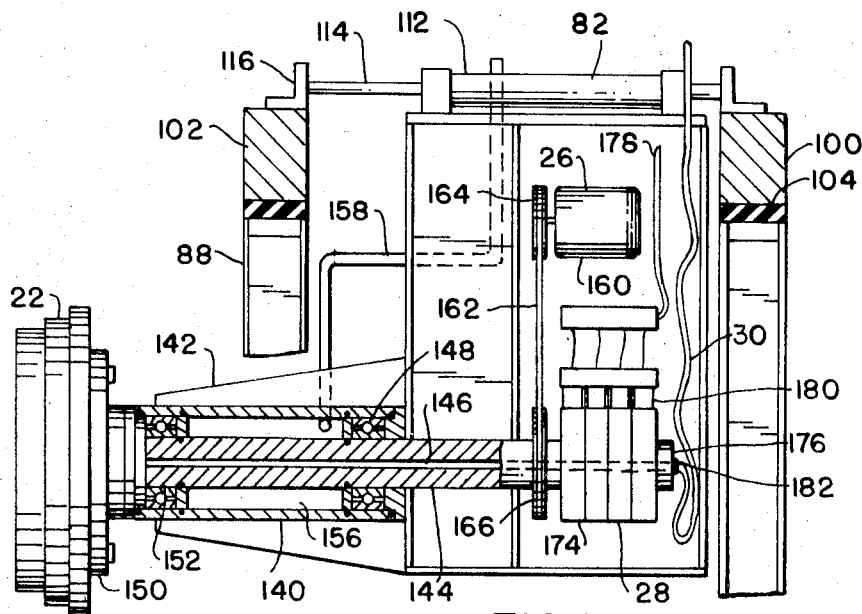
FIG. 3 is an enlarged, partial section view of the structure for electrical machining illustrated in FIG. 1 taken substantially on the line 3–3 in FIG. 1 showing one spindle and dry chamber box structure.

The hoods 96 each include a pair of steel bars 100 and 102 extending parallel to each other transversely of the spindles 18 and 20 which are insulated electrically from the dielectric tank 12 by means of insulator blocks 104 positioned on the reinforcing members 88 provided, as shown best in FIG. 3. Hoods 96 are completed by a hood cover which may be secured to the bars 100 and 102 in any convenient manner, such as by screws.

The hood at the right-hand side of the machine tool 11, as shown in FIG. 1, is fixed in place. However, the hood at the left, as shown in FIG. 1, is adjustable transversely of the spindles 18 and 20 by the structure 60 shown in FIG. 5, whereby the spindles 18 and 20 may be exactly aligned with each other to provide proper relation between the machined surfaces on the opposite sides of the workpiece 42.

The structure 60 for adjusting the hood on the left in FIG. 1 includes a bracket 106 having an upwardly projecting portion 108 with threaded openings 110 therethrough. An additional steel abutment plate 112 is provided on the bars 100 and 102 of the hood 96, and a bolt 114 is threaded through the threaded opening 110 to engage the abutment member 112. Thus, with an adjusting structure 60 at each of the rectangularly positioned upright supports 88, the hood 96 may be adjusted transversely of the spindle 20 by tightening the bolts 114 at the front or rear of the hood 96 while similarly loosening the bolts at the rear or front, respectively, of the machine tool 11. The bolts 116 which secure the bars 100 and 102 to the reinforcing members 88 of the tank 12 are then tightened in their elongated slots 118 to secure the hood 96 and the dry chamber structure 16 carried thereby in an adjusted position, aligned with the dry chamber structure 14.

The dry chamber structures 14 and 16, as shown best in FIG. 3 are supported by the tank 12 through the hoods 96 on the parallel spaced apart rods 106 and 108 at each end of the electrical machining structure 10 carried by the bars 100 and 102. The dry chamber structures 14 and 16 are supported on the bars 106 and 108 by the bearings 110 for reciprocal movement toward and away from the center of the tank 12.

The reciprocal movement of the dry chamber structures 14 and 16 is effected by means of structure 82, including the hydraulic piston and cylinder structure 112 operable in conjunction with the piston 114. The piston rod 114 is connected to the bars 100 and 102 by means of the brackets 116. The hydraulic piston and cylinder structure 112 is actuated by the structure 38 which includes a hydraulic fluid storage tank 120 and a hydraulic pump 124 operable in conjunction with the usual electrohydraulic servocontrol apparatus 15 for electrical discharge machining equipment.

The piston and cylinder structure 112, together with the piston rod 114 at the ends of tank 12, are thus operable to move the dry chamber structures 14 and 16 toward or away from the workpiece 42 and to maintain a predetermined spark gap between the electrodes 22 and 24 and a workpiece 42 in operation. Hydraulic bypass lines 126 are provided in conjunction with the piston and cylinder structure 112 to permit stopping of the dry chamber structures in any position desired during, for example setup of a workpiece 42 and are manually opened or closed by the bypass valves 78 and 80 illustrated in FIG. 1.

The spindles 18 and 20, as shown best in FIG. 3, include an outer cylinder 140 supported by fins 142 on the dry chamber structures 14 and 16. A rotatable shaft 144 having an axial opening 146 therein is supported within the outer cylinder 140 by the sealed bearings 148, as shown, and is part of the spindle structure. A mounting plate 150 is secured to the end 152 of the shaft 144 for rotation therewith whereby electrodes, such as 22 and 24, may be secured to the spindle structures 18 and 20.

A chamber 156 is thus provided between the outer cylinder 140 and the shaft 144, as shown in FIG. 3. Chamber 156 is maintained filled with lubricating oil at a pressure sufficient to prevent dielectric fluid from the tank surrounding the dry chambers 14 and 16 and the spindles 18 and 20 from entering the dry chambers through the spindles. A lubricating oil pipe 158 communicating with the chamber 156 is provided to facilitate supply of the oil under pressure.

The structure 26 for rotating the spindles 18 and 20 includes, as shown in FIG. 3, a hydraulic motor 160, a belt mounting wheel 164 rotatable with the motor and a belt mounting wheel 166 secured to the shaft 144 for rotation therewith. The speed of rotation of the motors 160 and thus the shafts 144 is separately controlled through the control valves 68 and 70 for the spindles 18 and 20, respectively. The hydraulic fluid under pressure for the operation of the motors 160 may be supplied from the tank 168 and through the filter 170 by the motor 172 of the hydraulic fluid supply means 32 by appropriate hydraulic conduit, as indicated in FIG. 2.

Rotatable slip rings 174 are secured to the end 176 of shaft 144 of each of the spindles 18 and 20 whereby electrical energy from a conductor 178 connected to an electrical discharge machine power supply 13 through structure 28 is supplied to the slip rings 174 through the brushes 180. Thus, electrical machining may be separately controlled for each of the electrodes 20 and 22 connected to their own power supply 13. Similarly, as will be understood by those in the art, separate servocontrol apparatus are used to drive the pistons and cylinder structures 112 to move the electrodes 22 and 24 separately in accordance with the spark gap between the separate electrodes and the workpiece 42.

A rotatable coupling 182 is provided on the end 176 of the shaft 144 for the connecting of structure 30, including a dielectric conduit to the shaft 144. Thus, dielectric fluid may be pumped from the dielectric fluid supply means 34 into the opening 146 through the shaft 144 through the mounting plate 150 which has a similar opening therein and through openings specifically provided for the distribution of dielectric in the electrodes 22 and 24. Thus, electrical machining of the workpiece 42 may be carried out in the presence of a dielectric fluid which fluid may subsequently be drained from the tank 12 through an overflow pipe 184 set to maintain a predetermined level of dielectric fluid in the tank 12.

If it is desired to rapidly empty the tank 12 of dielectric fluid, the structures 48, each including a pump 186 and motor 188, may be actuated from the control panel 84. Similarly if it is desired to fill the tank with dielectric rapidly, the fluid intake connections 44 which may be connected to a central dielectric supply (not shown) may be opened from the control panel 184 to flood the tank 12. Level control switches 52, as previously indicated, are provided to insure proper dielectric level in the tank 12 as required.

The workpiece 42 may be removed from or positioned in the clamping structure 58 by means of the crane 66 secured to the tank 12 by appropriate brackets 190. Crane 66 includes the telescoping sections 192 under the control of the hydraulic valve 64 for raising and lowering the boom 194. The carriage 196 is movable on the boom 194 to permit horizontal movement of a workpiece secured to the carriage 196 by chains or the like. The section 198 of the crane 66 is rotatable about the axis of the telescoping members whereby with the front plate 92 removed from the tank 12, a workpiece may be lifted from a skid or truck positioned in front of the tank 12 and moved into position over the clamping structure 58 within the tank 12.

The clamping structure 58 includes the half-round clamp members 200 and 202 which are connected by pivot means 204 at one end. Eccentric clamping means 206 are provided at the other end of the half-round members 200 and 202 to secure them together with a workpiece 42 clamped therebetween. The workpiece 42 is secured in position in the half-round members 200 and 202 by means of the brackets 208 positioned in angularly spaced apart locations thereabout. The lower half-round member 202 is supported from the worktable 54 by the vertical bracket 210.

In operation, the upper half-round member 200 is pivoted clockwise about the pivot structure 204 by means of the piston and cylinder 212 secured to the bottom of the tank 12 and to the lever 214 attached to the upper half-round member 200 to open or close the half-round member 200 with the clamping means 206 released on actuation of the hydraulic valve 62. Thus, handling of relatively large workpieces 42 is completely automated so that no manual clamping or moving of the workpieces into or out of the tank 12 is required.

The worktable 54, positioned in the tank 12, as best shown in FIG. 2, is levelled after installation by the levelling structure 56, illustrated best in FIG. 6.

The levelling structure 56 includes the threaded levelling member 220 having the annular opening 224 extending therethrough and the angularly spaced apart, axially extending recesses 226 in the upper surface 228 thereof. The lower end 230 of the levelling member 220 is received in the shallow recess 232 in the bottom of the tank 12 while the entire member 220 is received in the lower threaded portion 234 or the opening 236 in the worktable 54.

A levelling collar 238 is rotatably received in the upper enlarged diameter portion of the opening 236 through the worktable 54 and is provided with recesses 240 in the upper surface thereof and 242 in the lower surface for receiving a spanner wrench and the upper ends of the pins 244, the lower ends of which are received in the recesses 226 of the levelling member 220, respectively. An opening 246 is provided through the levelling collar 238 for receiving the bolt 248 threaded into the tapped opening 250 in the base of the tank 12.

Thus, when it is desired to level the worktable 54 in the tank 12, the bolts 248 of levelling structures 56 provided at a plurality of positions on the worktable 54 are loosened, the collars 238 are then rotated to rotate the levelling members 220 through the pins 244, whereby the worktable is levelled on the bottom of the tank 12. The bolts 248 are then retightened to maintain the levelling collars 238 and thus the levelling members 220 in an adjusted position.

In overall operation of the structure for electrical machining 10, the clamping structure 58 is actuated so that the half-round members 200 and 202 are opened, a workpiece is mounted in the clamping structure 58 by means of the crane 66 with the front plate 92 removed from the tank 16, the clamping means 58 is then closed and locked whereby the workpiece is held in a predetermined position with respect to the spindle 20. The spindle 18 is then adjusted transversely by means of the adjusting structure 60 to exactly align the spindle 18 with the spindle 20 whereby exactly aligned surfaces will be machined on opposite sides of the workpiece 42.

The cover 92 is replaced and dielectric fluid is supplied through the spindles from the structure 30. Electrical energy is supplied to the electrodes through the spindles 18 and 20 and the conductor 178, brushes 180 and commutators 174. The spindles 18 and 20 are rotated by means of the rotating structure 26 in the dry chambers 14 and 16 and the spindles 18 and 20 are moved toward the workpiece 42 on operation of the piston and cylinder structures 112. Electrical machining of the workpiece 42 then proceeds in usual manner with a predetermined spark gap being maintained between the electrodes 22 and 24 and the workpiece 42 by the usual servocontrol apparatus 15 in conjunction with the piston and cylinder structures 112.

While one embodiment of the present invention has been considered in detail, it will be understood that other embodiments and modifications are contemplated by the inventor. It is therefore the intention to include all embodiments and modifications of the disclosed electrical machining structure and method as are defined by the appended claims within the scope of the invention.

What I claim as my invention is:

1. Structure for electrical machining comprising separate coaxial means for supporting disc electrodes at opposite sides of a workpiece, means for moving the electrodes toward the workpiece operable to maintain a predetermined gap between each of the electrodes and workpiece, means for simultaneously rotating the electrodes carried by the means for supporting the electrodes, and means connected to the means for supporting the electrodes for passing electrical energy between the electrodes and workpiece in the presence of a dielectric fluid.

2. Structure as set forth in claim 1, wherein the means for supporting the electrodes comprise dry chamber box structure supported for reciprocal movement on a pair of parallel rods.

3. Structure as set forth in claim 2 and further including a fluid tank in which the spindle is immersed and means for pressurizing the spindle.

4. Structure as set forth in claim 1 and further including means for transversely adjusting one of the means for supporting an electrode, whereby the electrodes may be readily aligned.

5. Structure as set forth in claim 1 and further including hydraulic means for clamping a workpiece in position between the means for supporting electrodes.

6. Structure as set forth in claim 1 and further including a worktable positioned beneath the means for supporting electrodes and means operably associated with the worktable for levelling the worktable in position.

7. A method of electrical machining comprising supporting coaxial disc electrodes on opposite sides of a workpiece to be machined, and moving the electrodes axially toward the workpiece to maintain a predetermined gap between the electrodes and workpiece and simultaneously rotating the electrodes in the presence of a dielectric fluid while passing electrical energy between the electrodes and workpiece.

8. Structure as set forth in claim 2 wherein the means for moving the electrodes includes piston and cylinder structure connected to the dry chamber structure.

9. Structure as set forth in claim 2 wherein the means for simultaneously rotating the electrodes includes a rotatable spindle carried by the dry chamber structure.

10. Structure for electrical machining comprising separate means for supporting electrodes at opposite sides of a workpiece comprising dry chamber box structure supported for reciprocal movement on a pair of parallel rods, means for moving the electrodes toward the workpiece to maintain a predetermined gap therebetween including piston and cylinder structure connected to the dry chamber structure, means for simultaneously rotating the electrodes operably associated with the means for supporting the electrodes including rotatable spindles carried by the dry chamber structures, a fluid tank in which the spindles are immersed and means for pressurizing the spindles, means for transversely adjusting one of the means for supporting an electrode whereby the electrodes may be readily aligned, hydraulic means for clamping a workpiece in position between the means for supporting electrodes, a worktable positioned beneath the means for supporting electrodes and means operably associated with the worktable for levelling the worktable in position and means for connecting the means for supporting the electrodes for passing electrical energy between the electrodes and workpiece in the presence of a dielectric fluid.

11. Structure for electrical machining comprising separate coaxial means for supporting disc electrodes at opposite sides of a workpiece, means for moving the electrodes toward the workpiece operable to maintain a predetermined gap between each of the electrodes and workpiece, and means connected to the means for supporting the electrodes for passing electrical energy between the electrodes and workpiece in the presence of a dielectric fluid.

12. A method of electrical machining comprising supporting coaxial disc electrodes on opposite sides of a workpiece to be machined and moving the electrodes axially toward the workpiece to maintain a predetermined gap between the electrodes and workpiece in the presence of a dielectric fluid while passing electrical energy between the electrodes and workpiece.